United States Patent
Papini et al.

(10) Patent No.: US 10,644,500 B2
(45) Date of Patent: May 5, 2020

(54) CERAMIC PERMANENT MAGNET PROTECTION

(71) Applicant: General Electric Company, Schenectady, NY (US)

(72) Inventors: Francesco Papini, München (DE); Tiziana Bertoncelli, München (DE)

(73) Assignee: GE Global Sourcing LLC, Norwalk, CT (US)

( * ) Notice: Subject to any disclaimer, the term of this patent is extended or adjusted under 35 U.S.C. 154(b) by 5 days.

(21) Appl. No.: 15/859,908

(22) Filed: Jan. 2, 2018

(65) Prior Publication Data
US 2019/0207382 A1    Jul. 4, 2019

(51) Int. Cl.
*H02H 9/02*    (2006.01)
*H02H 7/08*    (2006.01)
(Continued)

(52) U.S. Cl.
CPC ............... *H02H 9/02* (2013.01); *H02H 7/06* (2013.01); *H02H 7/0833* (2013.01); *H02P 1/021* (2013.01); *H02P 29/027* (2013.01)

(58) Field of Classification Search
CPC .. H02M 7/003; H02M 5/4585; H02M 5/4505; H02J 3/26; H02J 3/1857; H02J 3/16; H02J 3/386; H02J 3/50
See application file for complete search history.

(56) References Cited

U.S. PATENT DOCUMENTS 3,427,484 A    2/1969    Karlby et al.
8,867,244 B2 *    10/2014    Trainer ................. H02J 3/1857
                                                              363/65
(Continued)

FOREIGN PATENT DOCUMENTS

CN    102983796 A    3/2013
WO    2013123879 A1    8/2013

OTHER PUBLICATIONS

Rosu, Marius et al., "Hysteresis Model for Finite-Element Analysis of Permanent-Magnet Demagnetization in a Large Synchronous Motor Under a Fault Condition", IEEE Transactions on Magnetics, vol. No. 41, Issue No. 06, Jun. 6, 2005, Digital Object Identifier 10.1109/TMAG.2005.848319, (pp. 2118-2123, 6 total pages).

(Continued)

*Primary Examiner* — Rina I Duda
(74) *Attorney, Agent, or Firm* — The Small Patent Law Group LLC; Josef L. Hoffmann

(57) ABSTRACT

According to some embodiments, system and methods are provided, comprising an electrical installation; one of a permanent magnet motor and a permanent magnet generator; a circuit operative to provide current to operate one of the motor and the generator; one or more sensors coupled to the electrical installation, wherein the one or more sensors are operative to detect an overcurrent in the circuit and to generate an overcurrent signal; one or more inductors; and an inductance module control operative to: receive the overcurrent signal from the one or more sensors; determine how to insert one or more inductors to reduce an amplitude of the overcurrent; activate the one or more inductors based on the determination; and deactivate the one or more inductors when the overcurrent is not detected. Numerous other aspects are provided.

20 Claims, 4 Drawing Sheets

(51) Int. Cl.
*H02H 7/06* (2006.01)
*H02P 1/02* (2006.01)
*H02P 29/024* (2016.01)

(56) References Cited

U.S. PATENT DOCUMENTS

| | | | | |
|---|---|---|---|---|
| 9,065,299 | B2* | 6/2015 | Trainer | H02J 3/36 |
| 9,291,678 | B2 | 3/2016 | Aalund et al. | |
| 9,553,536 | B2 | 1/2017 | Kimiabeigi | |
| 2007/0001533 | A1 | 1/2007 | Jansen et al. | |
| 2010/0025995 | A1* | 2/2010 | Lang | H02M 5/4505 |
| | | | | 290/44 |
| 2010/0226157 | A1* | 9/2010 | Ohnishi | H02M 5/4585 |
| | | | | 363/131 |
| 2012/0299305 | A1* | 11/2012 | Brogan | H02J 3/386 |
| | | | | 290/55 |
| 2015/0229249 | A1 | 8/2015 | Jang et al. | |
| 2015/0308412 | A1* | 10/2015 | Zagrodnik | H02M 7/003 |
| | | | | 290/44 |
| 2015/0369217 | A1* | 12/2015 | Gupta | H02J 3/16 |
| | | | | 290/44 |

OTHER PUBLICATIONS

Kim, Hyung-Gyu et al., "Irreversible Demagnetization Analysis of IPM Type BLDC Motor Considering the Circulating Current by Stator Turn Fault", Digests of the 2010 14th Biennial IEEE Conference on Electromagnetic Field Computation, Jun. 7, 2010, Chicago, IL, ISSN: 978-1-4244-7062-4, 1pg.

Braun, Jochen et al., "Protection Against Demagnetization With Rotor Coils for Permanent Magnet Synchronous Machines", 2016 XXII International Conference on Electrical Machines (ICEM), 2016, Lausanne, Switzerland, ISSN: 978-1-5090-2538-1, (pp. 550-556, 7 total pages).

* cited by examiner

CERAMIC PERMANENT MAGNET PROTECTION

BACKGROUND

Electrical machines, such as motors and generators, often include a rotor and a stator. In the case of synchronous permanent magnet motors or generators, these rotors generally include magnetic elements mounted thereto. These magnetic elements facilitate the conversion of electrical energy to kinetic energy and vice versa. For example, in generators, the kinetic energy of the rotor's rotation is converted into electrical energy by inducing electric voltage and current in the stator windings. During fault conditions, the magnetic elements in the rotor may be subjected to strong demagnetization fields. Demagnetization of the magnet may result in failure of the machine.

It would be desirable to provide systems and methods to protect magnet-assisted machines during fault conditions.

BRIEF DESCRIPTION

According to some embodiments, a system includes an electrical installation; one of a permanent magnet motor and a permanent magnet generator; a circuit operative to provide current to operate one of the motor and the generator; one or more sensors coupled to the electrical installation, wherein the one or more sensors are operative to detect an overcurrent in the circuit and to generate an overcurrent signal; one or more inductors; and an inductance module control operative to: receive the overcurrent signal from the one or more sensors; determine how to insert one or more inductors to reduce an amplitude of the overcurrent; activate the one or more inductors based on the determination; and deactivate the one or more inductors when the overcurrent is not detected.

According to some embodiments, a method includes providing an electrical installation, wherein the electrical installation includes at least one of a permanent magnet motor and a permanent magnet generator, and a circuit operative to provide current to one of the motor and the generator; receiving an overcurrent signal from one or more sensors coupled to the electrical installation, wherein the overcurrent signal indicates detection of an overcurrent; determining how to insert one or more inductors to reduce an amplitude of the overcurrent; activating the one or more inductors; and receiving at least a portion of the overcurrent at the one or more activated inductors.

A technical effect of some embodiments of the invention is an improved and/or computerized technique and system for avoiding demagnetization of a magnet. Embodiments provide for switchable inductance that may be activated when the fault occurs in the stator circuit. Activation of the switchable inductance may avoid or greatly diminish demagnetization. At a circuit level, the total impedance may be modified when the fault is sensed in such a way to limit the fault current surge (e.g., overcurrent). By limiting the overcurrent responsible for demagnetization, permanent magnet damage danger may be avoided or strongly diminished. By minimizing demagnetization risk, the adoption of non-rare-earth (e.g., ferrite, ceramic, etc.) assisted synchronous permanent magnet machines may become easier, resulting in an overall less expensive powertrain as compared to the usage of rare-earth permanent magnet motors. Additionally, in the case the fault occurs in the converter supplying the machine, in one or more embodiments the fault may not affect the motor connected to the mechanical machine, resulting in a quicker and less expensive maintenance, lowering part replacement costs.

With these and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Electrical installations for power applications may include permanent magnet devices, motors or generators. As used herein, "electrical machine" may refer to a motor and/or a generator. Fault conditions, such as a short circuit, often generate magnetic fields opposite to the magnetic fields produced by a magnet element(s) operating in such devices. Unfortunately, these newly generated magnetic fields may demagnetize the magnetic elements. Particularly, the edges of the magnetic elements are susceptible to a decrease in the component of the magnetic field parallel to the magnetization direction of the magnet and as such, a loss of magnetization. A decrease in magnetic field beyond a certain level may cause irreversible demagnetization of the magnetic elements. Irreversible demagnetization results in reduced power and torque capability of the installed product and may require disassembly and re-magnetization to restore the installed product to its original condition. Irreversible demagnetization increases the downtime of the installed product, which adds to the cost of the re-magnetization.

In one or more embodiments, when an overcurrent is detected by a sensor on an installed product, at least one inductor is activated. In one or more embodiments, the inductor may be added to a circuit providing power to the electrical installation, and may be added and activated by moving a switch in the circuit. The activated inductor may provide a magnetic force that reduces the amplitude of the overcurrent, thereby lessening the effect of the overcurrent on the installed product.

The term "electrical installation" should be understood to include any sort of mechanically operational entity, including, but not limited to, mining equipment, computed tomography (CT) scanners, jet engines, locomotives, gas turbines, medical equipment and wind turbines at wind farms and their auxiliary systems as incorporated. The term is most usefully applied to large complex systems with many moving parts, numerous sensors and controls installed in the system. The term "installation" includes integration into physical operations such as the engines in mining vehicles, engines in an aircraft fleet whose operations are dynamically controlled, a locomotive in connection with railroad operations, turbines in connection with a windfarm, or apparatus construction in, or as part of, an operating plant building, machines in a factory or supply chain and etc. As used herein, the terms "electrical installation," "installed product" and "machine" may be used interchangeably.

As used herein, the term "automatically" may refer to, for example, actions that may be performed with little or no human interaction.

Figure 1:
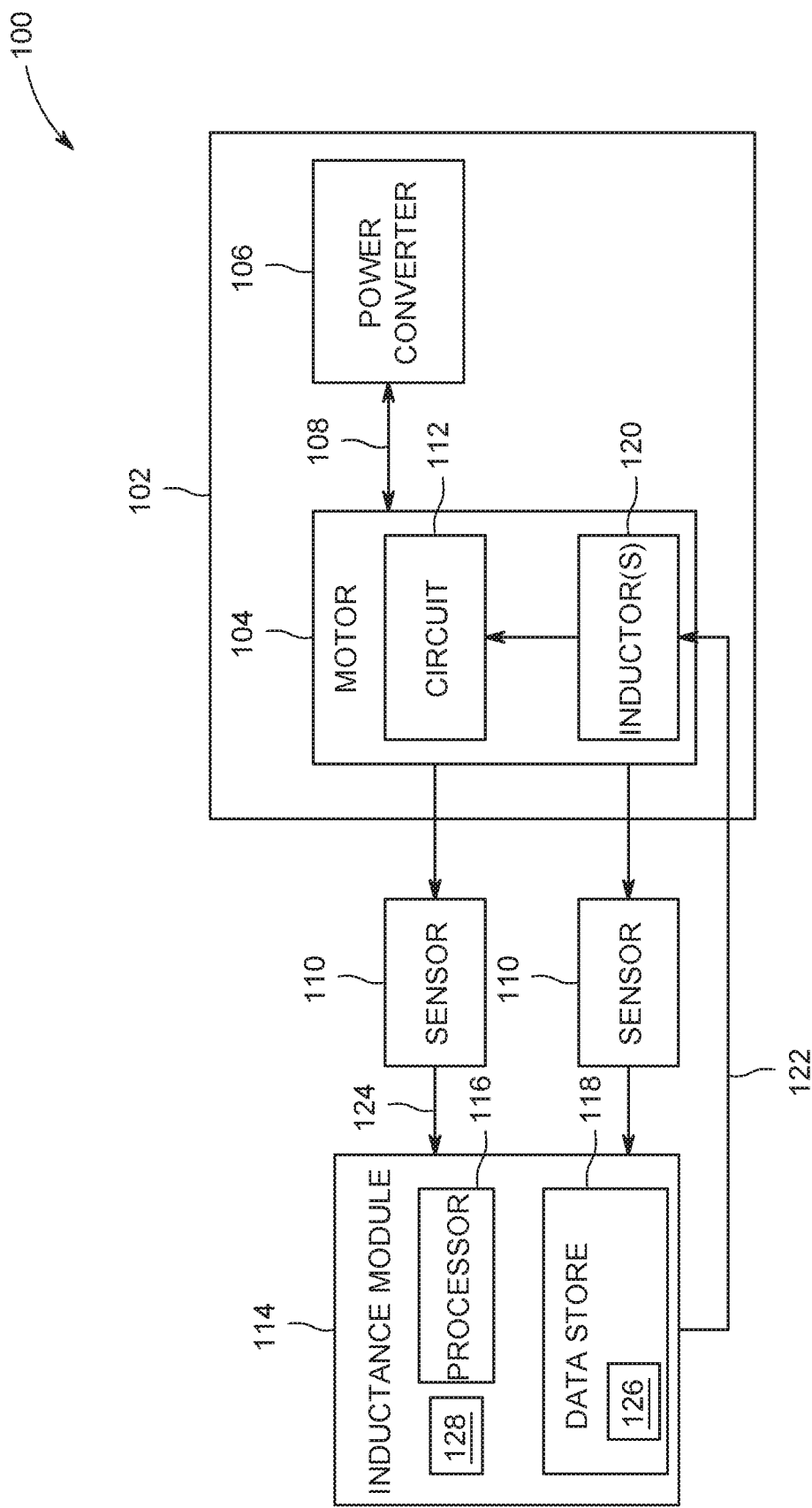
FIG. 1 illustrates a system diagram according to some embodiments.

Turning to FIG. 1, a system 100, including an electrical installation 102, according to embodiments is provided. FIG. 1 represents a logical architecture for describing processes according to some embodiments, and actual implementations may include more or different components arranged in other manners.

The electrical installation 102 may include a permanent magnet motor (or generator) 104 ("motor"), and a power converter 106 that supplies power to the motor 104. While the non-exhaustive examples described herein reference a permanent magnet motor as included in the electrical installation, a permanent magnet generator may instead be included in the electrical installation. An electrical connector 108 may couple the power converter 106 to the motor 104. The electrical connector may be a cable, busbars, or any other suitable electrical connector.

The system 100 may include at least one sensor 110 operative to detect a fault within the electrical installation 102. As used herein, a "fault" may refer to an abnormal condition of the electrical system. The fault may cause an overcurrent condition in which excessive current or a current surge may pass through the circuit. A fault may occur, for example, between two different winding turns that lose insulation, and contact each other, or for any other suitable reason. While two sensors 110 are shown herein, any suitable number of sensors may be used. It is noted that a plurality of sensors 110 may be used to detect the possible plurality of faults that may occur. For example, the sensor 110 may be positioned on the electrical connector 108 that connects the power converter 106 to the motor 104. However, if a fault inside the motor 104 occurs, the sensor 110 positioned on the electrical connector 108 may not detect the fault.

The motor 104 may include a rotor (not shown) and a stator (not shown), each including magnetic elements. In one or more embodiments, a circuit 112 may supply current to the magnetic elements to create a magnetic field that may operate the motor 104.

In one or more embodiments, the system 100 may include an inductance module control 114. As described further below with respect to FIG. 3, the inductance module 114 may activate one or more inductors to avoid or strongly diminish demagnetization. In one or more embodiments, the inductance module 114 may include a processor 116 and a data store 118. It is also noted that while the sensors 110 and inductance module 114 are positioned outside of the installed product 102 in FIG. 1, they may also be installed within the installed product 102. In embodiments, instead of the inductance module, the one or more inductors may be added to the system via a circuital arrangement provided by existing circuital elements.

The processor 116 may, for example, be a conventional microprocessor, and may operate to control the overall functioning of the inductance module 114. In one or more embodiments, the processor 116 may be programmed with a continuous or logistical model of industrial processes that are used by the electrical installation 102.

In one or more embodiments, the data store 118 may comprise any combination of one or more of a hard disk drive, RAM (random access memory), ROM (read only memory), flash memory, etc. The data store 118 may store software that programs the processor 116 and the inductance module 114 to perform functionality as described herein.

The data stored in the data store 118 may be included in a relational database, a multi-dimensional database, an eXtendable Markup Language (XML) document, and/or any other structured data storage system. The physical tables of data store 118 may be distributed among several relational databases, multi-dimensional databases, and/or other data sources. The data of data store 118 may be indexed and/or selectively replicated in an index.

The data store 118 may implement an "in-memory" database, in which volatile (e.g., non-disk-based) storage (e.g., Random Access Memory) is used both for cache memory and for storing data during operation, and persistent storage (e.g., one or more fixed disks) is used for offline persistency of data and for maintenance of database snapshots. Alternatively, volatile storage may be used as cache memory for storing recently-used database data, while persistent storage stores data. In some embodiments, the data comprises one or more of conventional tabular data, row-based data stored in row format, column-based data stored in columnar format, and object-based data.

The inductance module 114, according to some embodiments, may access the data store 118 and utilize the processing elements 116 to activate one or more inductors 120. As used herein, an "inductor" 120 may refer to an electrically conductive element (e.g., silver, copper, aluminum) properly arranged/shaped/wound around a ferromagnetic core that may be coupled to the circuit 112 to create an additional magnetic field that may be used to condition the circuit faulty current in such a way that it is no longer demagnetizing. In one or more embodiments, the inductor may be a wire that may be wound around a ferro-magnetic core, or other suitable element, to create a larger magnetic field, as compared to being present without being wound around another element. In embodiments, the inductor may be a special arrangement of the existing circuital elements with current redirection. When activated, the one or more inductors 120 may change the topology of the circuit 112 to modify the total impedance of the circuit to limit the fault current surge. In one or more embodiments, the activation of the one or more inductors 120 may directly and automatically operate the motor 104 without further human interaction.

A communication channel 122 may be included in the system 100 to supply data from at least one of the electrical installation 102 and the data store 118 to the inductance module 114. In some embodiments, signals received by the inductor 120 may cause modification in the state or condition or another attribute of the electrical installation 102.

As used herein, devices, including those associated with the system 100 and any other devices described herein, may exchange information and transfer data ("communication") via any number of different systems, including one or more wide area networks (WANs) and/or local area networks (LANs) that enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 2:
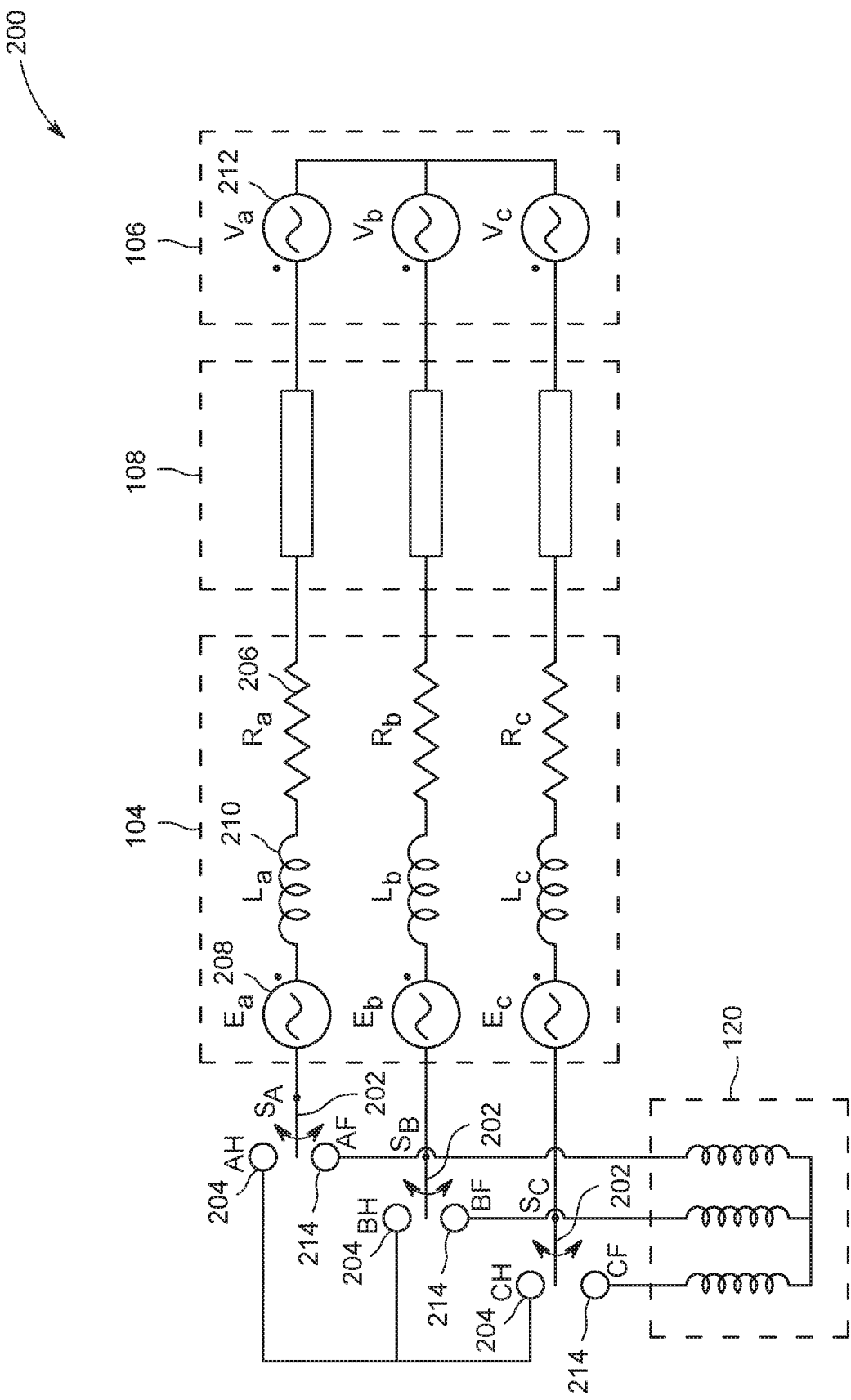
FIG. 2 illustrates a system diagram according to some embodiments.
Figure 3:
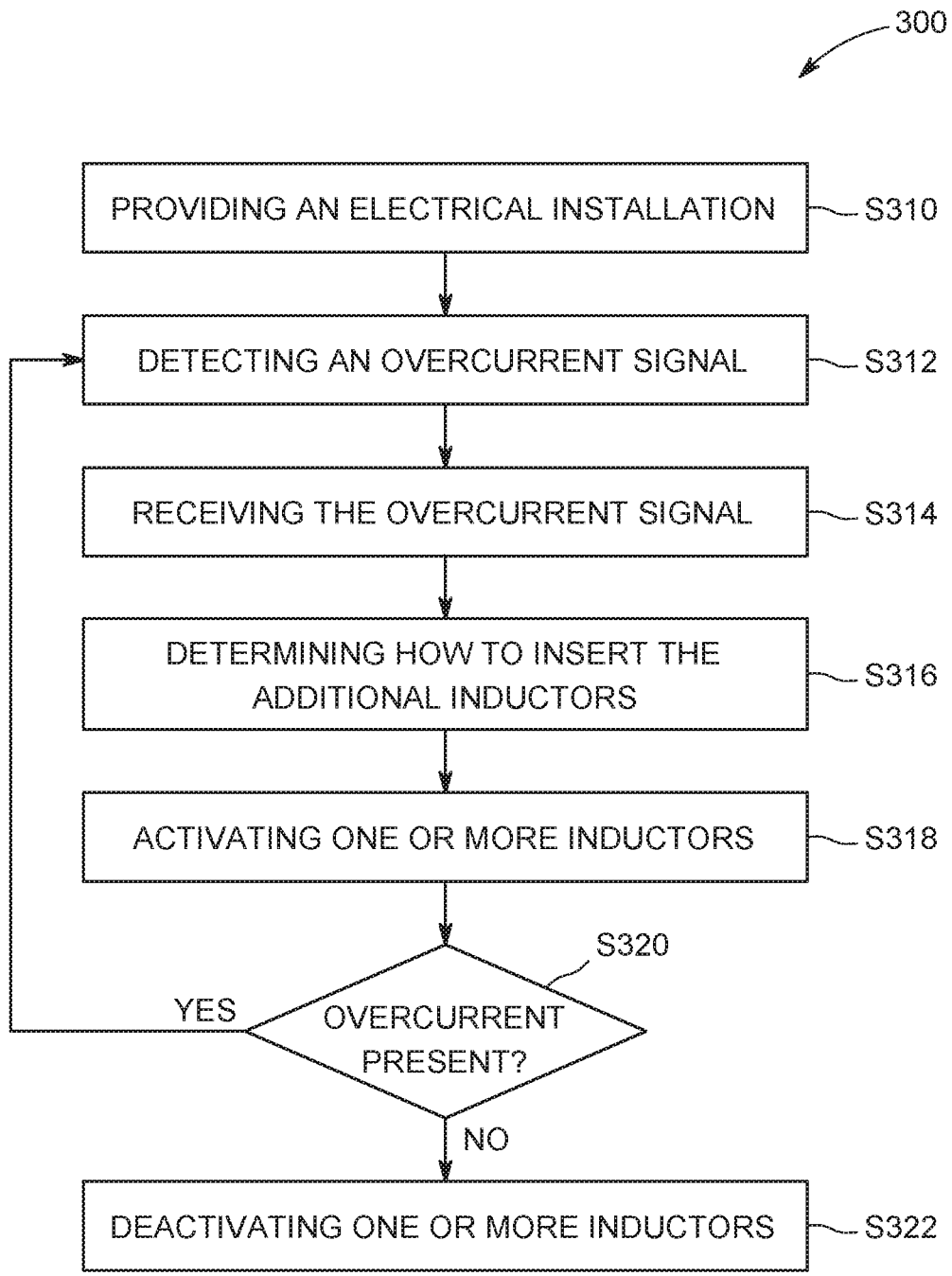
FIG. 3 illustrates a flow diagram according to some embodiments.

Turning to FIGS. 2 and 3, a circuit architecture 200 and a flow diagram of an example of operation according to some embodiments is provided. In particular, FIG. 3 provides a flow diagram of a process 300, according to some embodiments. Process 300, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 300 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Initially at S310, an electrical installation 102 is provided. As described above, the electrical installation 102 may be any sort of mechanically operational entity, including, but not limited to, mining equipment, computed tomography (CT) scanners, jet engines, locomotives, gas turbines, medical equipment and wind turbines at wind farms and their auxiliary systems as incorporated. As a non-exhaustive example, the circuit architecture 200 shown in FIG. 2 includes three switches 202 (SA, SB, SC), that may be used to implement a connection for the circuit during normal operation, and a connection with the inductor 120 during detection of a fault. Any suitable number of switches may be used. In one or more embodiments, the inductor 120 may be connected in series to the circuit 112. The circuit architecture 200 may include three terminals 204 (AH, BH, CH), that when closed (e.g., the switch 202 contacts the terminal 204) provide for normal operation of the circuit 200 (e.g., the current flows through these terminals). Any suitable number of terminals 204 may be used. In one or more embodiments, the circuit 200 may also include one or more resistors 206 in the motor 104 itself, as well as the electrical connector 108 connecting the motor 104 to the power converter 106. The motor 104 may also include one or more voltage sources (E) 208 and one or more lumped equivalent inductances (L) 210. The power converter 106 may include one or more voltmeters 212.

Then, an overcurrent signal 124 is detected in S312. In one or more embodiments, the overcurrent signal 124 may be detected when terminals AH, BH and CH are closed (e.g., during normal operation of the circuit) or during a fault condition, as described below, when at least one of inductor terminals AF, BF and CF 214 are closed. In one or more embodiments, at least one sensor 110 may detect an overcurrent. Then in S314, the sensor 110 transmits the overcurrent signal 124, and it is received by the inductance module 114. In one or more embodiments, the overcurrent signal 124 may indicate the existence of the overcurrent condition as well as the amount of overcurrent.

Next, in S316, the inductance module 114 determines how to insert the additional inductors 120 into the equivalent circuit. In embodiments, the inductance module 114 may determine the amount of inductance needed to damp the overcurrent (e.g., reduce the amplitude of the overcurrent), and a corresponding number of inductors to supply that inductance. The determination may be based on at least one of: the data in an inductance table 126, stored in the data store 118, for example, that provides a relationship between detected overcurrent, inductance and inductor 120; and execution of a model 128.

In embodiments, prior to execution of the process 300, a peak overcurrent that may be generated for the electrical installation 102 may be determined (via, for example, simulations and calculations). It is noted that each particular type of electrical installation may be capable of generating a different peak overcurrent. Then, based on this peak overcurrent, an amount of inductance to reduce the amplitude of this peak overcurrent may be determined. In embodiments, instead of determining how to insert the inductors 120 based on the amount of sensed overcurrent, the inductors that may counter the peak overcurrent may be inserted.

Then in S318, the one or more inductors 120 are activated based on the determined insertion. In one or more embodiments, the one or more inductors 120 may be activated via a digital pulse (e.g., MOSFET) that may actuate one or more of the switches 202 to move from contact with the circuit terminal 204 to contact with a respective inductor terminal 212. In one or more embodiments, the digital pulse may be supplied with power by a dedicated battery or by the DC bus that supplies the electrical installation 102 with power. While FIG. 2 shows three inductor terminals 214 (AF, BF, and CF), any suitable number of inductor terminals 214 may be used. As described above, the amount of inductance needed to reduce the amplitude of the overcurrent may be supplied by less than all of the inductors 120. In that instance, less than all of the switches 202 may be actuated. In other words, some of the switches 202 may remain in contact with the circuit terminal 204.

In an alternative embodiment, the one or more inductors 120 may be activated via transmission of an analog signal. For example, the analog signal may send a particular voltage to an electro-mechanical relay, which activates the one or more inductors 120 to provide inductance. For example, when the overcurrent is detected, the relay may close the circuit that diverts the over current through these inductors 120. In embodiments, the inductance module 114 may send the digital pulse or analog signal. In other embodiments (e.g., where the system responds to counter a peak overcurrent, regardless of the amount of actual overcurrent), the inductor 120 may be activated via an electro-mechanical relay where detection of an overcurrent by a sensor directly activates the one or more inductors 120.

In one or more embodiments, the activation of the one or more inductors 120 may change the path of the current (and in this case overcurrent) whereby, in addition to flowing through the motor 104, at least a portion of the current will also flow through the one or more inductors 120, where it will be damped by the inductance. As shown herein in FIG. 2, the inductors 120 are inserted in cascade, so that they receive the entire overcurrent. In other embodiments, the one or more inductors may be connected in parallel, and in that instance, only a portion of the total current may flow through the inductors according to the overall impedance.

Turning back to the process 300, in S320 it is determined whether the overcurrent continues to be present. When, in S320, it is determined the overcurrent is still present, via detection by the one or more sensors 110, for example, the process 300 may return to S312.

When, in S320, it is determined the overcurrent is no longer present, via detection by one or more sensors 110, for example, the process 300 may proceed to S322, and the one or more inductors 120 are deactivated. For example, in one or more embodiments, to deactivate the inductors 120, the one or more switches 202 that are in contact with each respective inductor terminal 214 may be actuated to no longer contact the inductor terminal 214, and instead contact the circuit terminal 204. The inventors note that a benefit of one or more embodiments is that the one or more inductors 120 may be activated and deactivated as needed, and may not need to be replaced after they have been used (e.g., they are re-usable). It is noted that typically an overcurrent condition (e.g., fault) may decay to a non-damaging level in several milliseconds, depending in part on the amount of overcurrent and the industrial product, as well as other factors. In one or more embodiments, the one or more inductors 120 may include at least one of an automatic shut-off whereby the inductor 120 deactivates after a prescribed time and a cooling element (not shown) to avoid overheating of the inductor 120 and creation of an overcurrent condition in the inductor 120.

Figure 4:
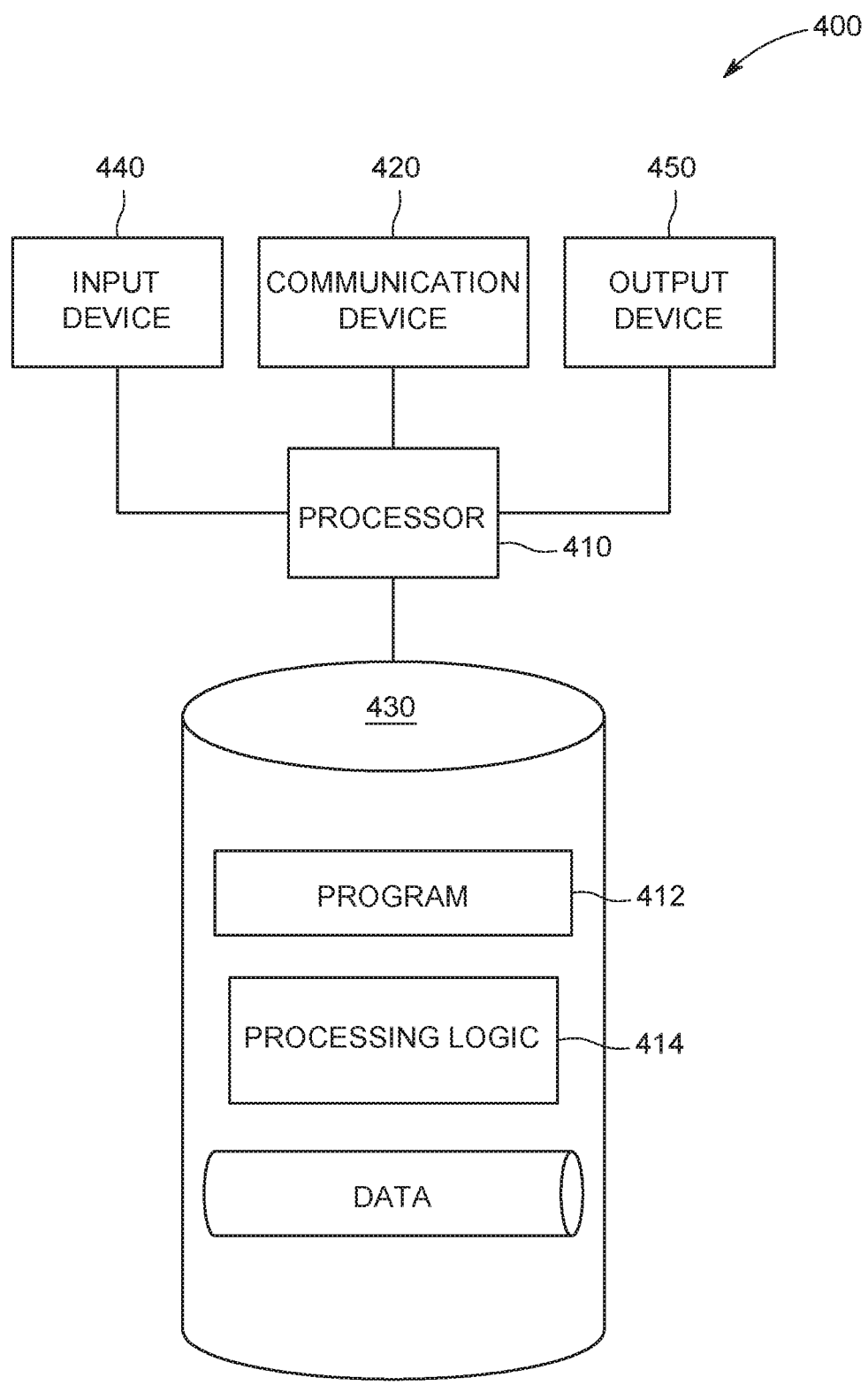
FIG. 4 illustrates a system diagram to some embodiments.

Note the embodiments described herein may be implemented using any number of different hardware configurations. For example, FIG. 4 illustrates an inductance platform 400 that may be, for example, associated with the systems described herein (e.g., system 100 of FIG. 1). The inductance platform 400 comprises an inductance processor 410 ("processor"), such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more users. The inductance platform 400 further includes an input device 440 (e.g., a mouse and/or keyboard to enter information) and an output device 450 (e.g., to output and display data).

The processor 410 also communicates with a memory/storage device 430. The storage device 430 may comprise any appropriate information storage device, including combinations of magnetic storage devices (e.g., a hard disk drive), optical storage devices, mobile telephones, and/or semiconductor memory devices. The storage device 430 may store a program 412 and/or inductance processing logic 414 for controlling the processor 410. The processor 410 performs instructions of the programs 412, 414, and thereby operates in accordance with any of the embodiments described herein. For example, the processor 410 may receive data and then may apply the instructions of the programs 412, 414 to determine an amount of inductance needed to damp an overcurrent and the inductors needed to supply the inductance.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by or "transmitted" to, for example: (i) the platform 400 from another device; or (ii) a software application or module within the platform 400 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 410 (FIG. 4). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system comprising:
   one of a permanent magnet motor or a permanent magnet generator;
   a circuit operative to provide current to the one of the motor or the generator;
   one or more sensors operative to detect an overcurrent in the circuit and to generate an overcurrent signal; and
   an inductance module control operative to:
      receive the overcurrent signal from the one or more sensors;
      determine whether to activate one or more inductors in the circuit to reduce an amplitude of the overcurrent based on the overcurrent that is detected;
      activate the one or more inductors based on the determination; and
      deactivate the one or more inductors responsive to the overcurrent not being detected.

2. The system of claim 1, wherein the one or more inductors are activated to avoid demagnetization of the one of the permanent magnet motor or permanent magnet generator.

3. The system of claim 1, wherein the one or more inductors include two or more of the inductors connected in a series in the circuit.

4. The system of claim 1, wherein reduction of the amplitude of the overcurrent by the inductance module control limits a current surge.

5. The system of claim 1, wherein the overcurrent signal is at least one or more of a digital pulse signal or an analog signal.

6. The system of claim 1, wherein activation of the one or more inductors further comprises:
   actuation of a switch to activate the one or more inductors in the circuit.

7. The system of claim 1, wherein an inductor of the one or more inductors is one of arranged, shaped or wound around a ferromagnetic core.

8. The system of claim 1, wherein an inductor of the one or more inductors is at least one of silver, copper, or aluminum.

9. The system of claim 1, wherein the one of a permanent magnet motor or a permanent magnet generator is coupled to one of a mining vehicle, a wind turbine, and an industrial motor.

10. A method comprising:
    providing at least one of a permanent magnet motor or a permanent magnet generator, and a circuit operative to provide current to the one of the motor or the generator;
    receiving an overcurrent signal from one or more sensors coupled to the circuit, wherein the overcurrent signal indicates detection of an overcurrent by the one or more sensors;
    determining whether to activate one or more inductors in the circuit to reduce an amplitude of the overcurrent based on the overcurrent signal received;
    activating the one or more inductors based on the determination; and
    receiving at least a portion of the overcurrent at the one or more inductors activated.

11. The method of claim 10, further comprising:
    deactivating the one or more inductors responsive to the overcurrent not being detected.

12. The method of claim 10, further comprising:
    determining an amount of inductors to activate based on the overcurrent signal received.

13. The method of claim 10, further comprising:
    avoiding demagnetization of the at least one of the permanent magnet motor or the permanent magnet generator based on activation of the one or more inductors.

14. The method of claim 10, wherein the one or more inductors include two or more of the inductors connected in a series in the circuit.

15. The method of claim 10, wherein reduction of the amplitude of the overcurrent by the one or more inductors limits a current surge.

16. The method of claim 10, wherein the overcurrent signal is one or more of a digital pulse signal or an analog signal.

17. The method of claim 10, wherein activating the one or more inductors includes
    actuating a switch to activate the one or more inductors in the circuit.

18. The method of claim 10, wherein the permanent magnet motor or the permanent magnet generator drives one of a mining vehicle or a wind turbine.

19. A system comprising:
    one of a permanent magnet motor or a permanent magnet generator;
    a circuit operative to provide current to the one of the permanent magnet motor or the permanent magnet generator;
    one or more sensors configured to detect an overcurrent in the circuit and to generate an overcurrent signal based on the overcurrent detected; and
    an inductance module control configured to:
       receive the overcurrent signal from the one or more sensors;
       activate one or more inductors coupled to the circuit to reduce an amplitude of the overcurrent in response to the overcurrent signal.

20. The system of claim 19, further comprising:
    a switch coupled to the circuit and the one or more inductors, and operably coupled to the inductance module, the switch configured to actuate to activate the one or more inductors in the circuit.

* * * * *